(12) United States Patent
Nakamura et al.

(10) Patent No.: US 8,080,123 B2
(45) Date of Patent: Dec. 20, 2011

(54) SUPPORTING PLATE, APPARATUS AND METHOD FOR STRIPPING SUPPORTING PLATE

(75) Inventors: Akihiko Nakamura, Kanagawa (JP); Atsushi Miyanari, Kanagawa (JP); Yoshihiro Inao, Kanagawa (JP)

(73) Assignee: Tokyo Ohka Kogyo Co., Ltd., Kanagawa (JP)

( * ) Notice: Subject to any disclaimer, the term of this patent is extended or adjusted under 35 U.S.C. 154(b) by 0 days.

(21) Appl. No.: 13/036,761

(22) Filed: Feb. 28, 2011

(65) Prior Publication Data

US 2011/0146899 A1   Jun. 23, 2011

Related U.S. Application Data

(62) Division of application No. 11/512,566, filed on Aug. 30, 2006, now abandoned.

(30) Foreign Application Priority Data

Aug. 31, 2005  (JP) ................................ 2005-251200

(51) Int. Cl.
 B29C 65/48 (2006.01)
 B32B 37/00 (2006.01)
 B32B 38/10 (2006.01)
 B32B 39/00 (2006.01)
 B32B 43/00 (2006.01)
(52) U.S. Cl. ...................................... 156/247; 156/703
(58) Field of Classification Search .................. 156/247, 156/701, 703, 708, 750, 755, 757
See application file for complete search history.

(56) References Cited

U.S. PATENT DOCUMENTS

| 5,273,615 | A  |    | 12/1993 | Asetta et al. |
| 5,447,596 | A  | *  | 9/1995  | Hayase .......................... 156/750 |
| 6,491,083 | B2 | *  | 12/2002 | De et al. ........................ 156/750 |
| 6,821,376 | B1 |    | 11/2004 | Rayssac et al. |
| 7,052,934 | B2 | *  | 5/2006  | Kurimoto et al. ............. 438/106 |
| 7,211,168 | B2 | *  | 5/2007  | Miyanari ....................... 156/701 |

(Continued)

FOREIGN PATENT DOCUMENTS

JP      2001-077304 A      3/2001

(Continued)

*Primary Examiner* — Sing P Chan
(74) *Attorney, Agent, or Firm* — Carrier Blackman & Associates, P.C.; Joseph P. Carrier; William D. Blackman

(57) ABSTRACT

A method for stripping a supporting plate from a circuit-formed surface of a substrate to which it is bonded with an adhesive by using a plate which has a first penetrating hole formed in a substantially central portion thereof in the thickness direction, a second penetrating hole formed in a peripheral portion thereof in the thickness direction, and a hole for attracting the supporting plate formed between the first penetrating hole and the second penetrating hole in the radial direction of the plate. The method involves supplying a solvent from outside to the first penetrating hole of the plate and to an associated first penetrating hole formed in a substantially central portion of the supporting plate; distributing the solvent from the first penetrating hole of the supporting plate through grooves formed on a surface of the supporting plate in contact with the adhesive and connecting with the first penetrating hole of the supporting plate; dissolving the adhesive with the solvent; and draining the solvent from a second penetrating hole connecting with the grooves and formed in a peripheral portion of the supporting plate and the second penetrating hole formed in the plate.

11 Claims, 7 Drawing Sheets

U.S. PATENT DOCUMENTS

| | | |
|---|---|---|
| 7,919,394 B2 * | 4/2011 | Nakamura et al. ............ 438/459 |
| 2004/0038498 A1 | 2/2004 | Ozono et al. |
| 2004/0188861 A1 | 9/2004 | Kurimoto et al. |
| 2005/0170612 A1 * | 8/2005 | Miyanari et al. ............ 438/459 |
| 2005/0173064 A1 | 8/2005 | Miyanari |
| 2006/0237142 A1 | 10/2006 | Park et al. |
| 2006/0285965 A1 | 12/2006 | Kabeshita et al. |
| 2007/0054470 A1 * | 3/2007 | Nakamura et al. ............ 438/459 |

FOREIGN PATENT DOCUMENTS

| | | |
|---|---|---|
| JP | 2002-203821 A | 7/2002 |
| JP | 2002-270676 A | 9/2002 |

* cited by examiner

SUPPORTING PLATE, APPARATUS AND METHOD FOR STRIPPING SUPPORTING PLATE

CROSS-REFERENCE TO RELATED APPLICATIONS

The present application is a divisional application of U.S. Ser. No. 11/512,566, filed 30 Aug. 2006, which claims priority from Japanese patent application 2005-251200, filed 31 Aug. 2005. The entire disclosures of the referenced priority documents are incorporated herein by reference.

BACKGROUND OF THE INVENTION

1. Field of the Invention

The present invention relates to a supporting plate which is used when a substrate such as a semiconductor wafer is thinned, and also relates to an apparatus and a method for stripping the supporting plate from the semiconductor wafer.

2. Description of the Background Art

There is a continuing need to make IC cards and cell phones thinner, smaller, and lighter. In order to satisfy this need, semiconductor chips to be incorporated therein must be thin. Although at present the thickness of a wafer which forms a semiconductor chip is 125-150 μm, it is expected that the thickness of a semiconductor wafer must be 25-50 μm for a next generation of chips.

An example of a conventional method for thinning a semiconductor wafer is shown in FIG. 8. Specifically, a protecting tape is attached to a surface (A-surface) of a semiconductor wafer on which a circuit (element) has been formed. The wafer is turned over, and the rear surface (B-surface) of the semiconductor wafer is ground by a grinder to make the wafer thinner. The B surface of the semiconductor wafer which has been thinned is fixed onto a dicing tape retained by a dicing frame, and the protecting tape covering the surface (A-surface) of the semiconductor wafer on which a circuit (element) has been formed is stripped in this state. Next, the wafer is cut into each chip by a dicing device.

The above-mentioned method has been disclosed in Document 1. According to Document 1, the heat-resistant protecting tape is stripped from the thinned semiconductor wafer by using a strong adhesive tape bonded to one end of the protecting tape.

Document 2 has disclosed that a protecting base obtained by immersing a ladder-type silicone oligomer in an aluminum nitride-boron nitride porous sintered material is used instead of a protecting tape, and the protecting base and a semiconductor wafer are bonded by using a thermoplastic film. Document 2 also mentions that they are immersed in pure water at 80° C. for 3 hours before stripping.

Document 3 has disclosed that a protecting base is made of a material having the same thermal expansion coefficient as a semiconductor wafer such as alumina, aluminum nitride, boron nitride, or silicon carbide.

Also, Document 3 has proposed a method in which the protecting base and the semiconductor wafer are bonded by using a thermoplastic resin such as polyimide, the semiconductor wafer is thinned by a grinder, and thereafter stripping is performed by immersing in water, amine, or a mixed solution of water and amine, or by using steam.

[Document 1] Japanese Patent Application Publication No. 2002-270676
[Document 2] Japanese Patent Application Publication No. 2002-203821
[Document 3] Japanese Patent Application Publication No. 2001-77304

In the above-mentioned techniques, since it is difficult for a solvent to enter between the supporting plate (protecting tape) and the semiconductor wafer when the supporting plate (protecting tape) is stripped from the semiconductor wafer, it takes too much time to strip the supporting plate from the semiconductor wafer.

Also, the thermoplastic film bonding the support plate (protecting tape) and the semiconductor wafer often fails to completely dissolve, and tends to be left in a state of sticking to either the support plate or the semiconductor wafer.

If an adhesive is left as described above, cracking or chipping of the semiconductor wafer easily occurs at the time of stripping.

In order to solve the above problem, the present applicant has proposed a supporting plate in which a plurality of penetrating holes are provided in the thickness direction of the supporting plate. FIG. 9 explains a method for stripping this supporting plate.

According to this method, a solvent supplying plate 102 is laid onto the upper surface of a supporting plate 100 via an O-ring 101. Next, a solvent is supplied from a solvent supplying pipe 103 to a space S surrounded by the supporting plate 100, the O-ring 101 and the solvent supplying plate 102. The solvent passes through penetrating holes 104 formed in the supporting plate 100, dissolves and removes an adhesive layer 105.

With the method of using a supporting plate in which a plurality of penetrating holes are provided, it is possible to securely remove an adhesive in a short period of time. However, another problem arises.

As shown in FIG. 10, the solvent leaks from the periphery of the supporting plate to the outside, and the solvent drops onto the dicing tape, which results in a deterioration of the dicing tape in a short period of time.

Further, efficiency of stripping is bad because part of a new solvent supplied to the space S is withdrawn without being utilized.

Furthermore, even if the adhesive is completely dissolved, if a finger or the like is used as a device for stripping the semiconductor wafer from the supporting plate, there is a strong likelihood that the circuit-formed surface of the semiconductor wafer will be damaged.

In order to solve the above-mentioned problems, an object of the present invention is to provide a supporting plate which makes it possible to easily strip the supporting plate from a substrate in a short period of time after thinning the substrate, and an apparatus and a method for stripping the supporting plate.

SUMMARY OF THE INVENTION

In order to solve the above-mentioned problems, according to one aspect of the present invention, there is provided a supporting plate to which a circuit-formed surface of a substrate is bonded with an adhesive, wherein a first penetrating hole is formed in a substantially central portion of the supporting plate in the thickness direction, grooves connecting with the first penetrating hole are formed on a surface of the supporting plate to be contacted with an adhesive, and a second penetrating hole connecting with the grooves is formed in a peripheral portion of the supporting plate in the thickness direction.

Since the supporting plate according to the first aspect of the present invention has a first penetrating hole formed in a substantially central portion thereof in the thickness direction, grooves formed on a surface of the supporting plate to be contacted with an adhesive so as to connect with the first penetrating hole, and a second penetrating hole formed in a peripheral portion of the supporting plate in the thickness direction so as to connect with the grooves, it is possible to use the first penetrating hole as a hole for supplying a solvent and the second penetrating hole as a hole for draining the solvent. With this, when the supporting plate is stripped from the substrate after the substrate is thinned, it is possible to supply the solvent quickly to the whole surface of the adhesive which bonds the substrate and the supporting plate so as to strip the supporting plate in a short period of time.

Also, if the second penetrating hole is used as a hole for supplying a solvent and the first penetrating hole is used as a hole for draining the solvent, the same effect can be achieved.

There is also provided according to a second aspect of the present invention an apparatus for stripping a supporting plate bonded to a circuit-formed surface of a substrate with an adhesive, comprising a plate which has a first penetrating hole formed in a substantially central portion thereof in the thickness direction, a second penetrating hole formed in a peripheral portion thereof in the thickness direction, and a hole for attracting the supporting plate formed between the first penetrating hole and the second penetrating hole in the radial direction of the plate.

Since the stripping apparatus according to the second aspect of the present invention comprises a plate which has a first penetrating hole formed in a substantially central portion of the plate in the thickness direction, a second penetrating hole formed in a peripheral portion of the plate in the thickness direction, and a hole for attracting a supporting plate formed between the first penetrating hole and the second penetrating hole in the radial direction, it is possible to use the first penetrating hole as a hole for supplying a solvent to the supporting plate and the second penetrating hole as a hole for draining the solvent from the supporting plate. With this, when the supporting plate is stripped from the substrate after the substrate is thinned, it is possible to supply the solvent quickly to the whole surface of the adhesive which bonds the substrate to the supporting plate so as to strip the supporting plate in a short period of time.

Also, if the second penetrating hole is used as a hole for supplying a solvent and the first penetrating hole is used as a hole for draining the solvent, the same effect can be achieved.

There is also provided according to a third aspect of the present invention a method for stripping a supporting plate bonded to a circuit-formed surface of a substrate with an adhesive, comprising the steps of supplying a solvent from outside to a first penetrating hole of a plate operatively associated with the supporting plate, distributing the solvent from a first penetrating hole of the supporting plate to grooves formed in the supporting plate and connecting with the first penetrating hole of the supporting plate, dissolving the adhesive on a surface of the supporting plate contacted with the substrate by the solvent, and draining the solvent used for dissolving the adhesive from a second penetrating hole of the supporting plate and a second penetrating hole of the plate.

Since the stripping method according to the third aspect of the present invention comprises the steps of supplying a solvent from outside to a first penetrating hole of a plate operatively associated with the supporting plate, distributing the solvent from a first penetrating hole of the supporting plate to grooves formed in the supporting plate and connecting with the first penetrating hole of the supporting plate, dissolving the adhesive on a surface of the supporting plate contacted with the substrate by the solvent, and draining the solvent used for dissolving the adhesive from a second penetrating hole of the supporting plate and a second penetrating hole of the plate, it is possible to supply the solvent quickly to the whole surface of the adhesive which bonds the substrate to the supporting plate so as to strip the supporting plate in a short period of time.

There is also provided according to a fourth aspect of the present invention a method for stripping a supporting plate bonded to a circuit-formed surface of a substrate with an adhesive, comprising the steps of supplying a solvent from outside to a first penetrating hole formed in one of a central portion and a peripheral portion of a plate operatively associated with the supporting plate, distributing the solvent from an associated first penetrating hole formed in one of a central portion and a peripheral portion of the supporting plate to grooves connecting with the first penetrating hole of the supporting plate, dissolving the adhesive on a surface of the supporting plate contacted with the substrate by the solvent, and draining the solvent used for dissolving the adhesive from a second penetrating hole formed in the other of the central portion and the peripheral portion of the supporting plate and an associated second penetrating hole formed in the other of the central portion and the peripheral portion of the plate.

Since the stripping method according to the fourth aspect of the present invention comprises the steps of supplying a solvent from outside to a first penetrating hole formed in one of a central portion and a peripheral portion of a plate, distributing the solvent from an associated first penetrating hole formed in one of a central portion and a peripheral portion of the supporting plate to grooves connecting with the first penetrating hole of the supporting plate, dissolving the adhesive on a surface of the supporting plate contacted with the substrate by the solvent, and draining the solvent used for dissolving the adhesive from a second penetrating hole formed in the other of the central portion and the peripheral portion of the supporting plate and an associated second penetrating hole formed in the other of the central portion and the peripheral portion of the plate, it is possible to supply the solvent quickly to the whole surface of the adhesive which bonds the substrate and the supporting plate so as to strip the supporting plate in a short period of time.

DETAILED DESCRIPTION OF THE PREFERRED EMBODIMENTS

Figure 1:
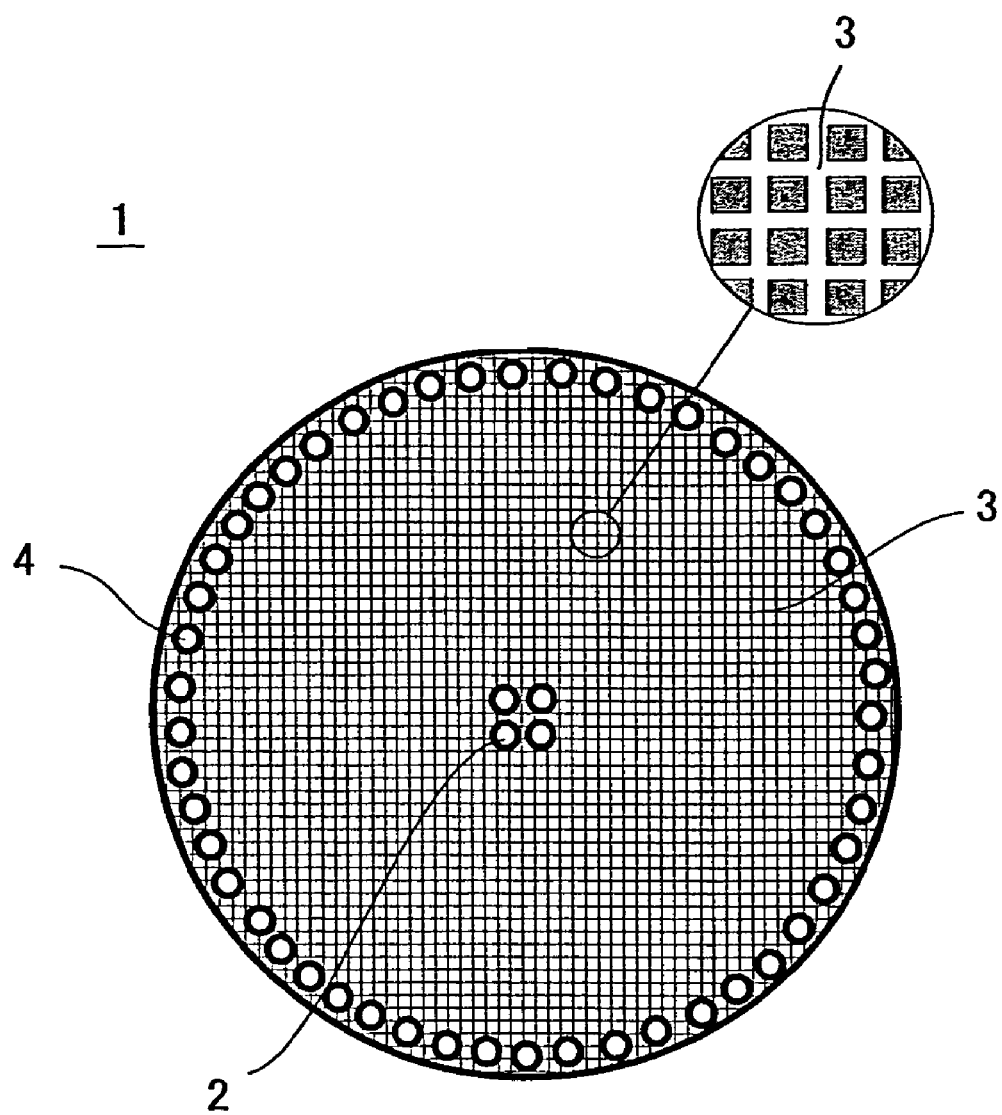
FIG. 1 is a schematic view showing an embodiment of a supporting plate according to the present invention.
Figure 2:
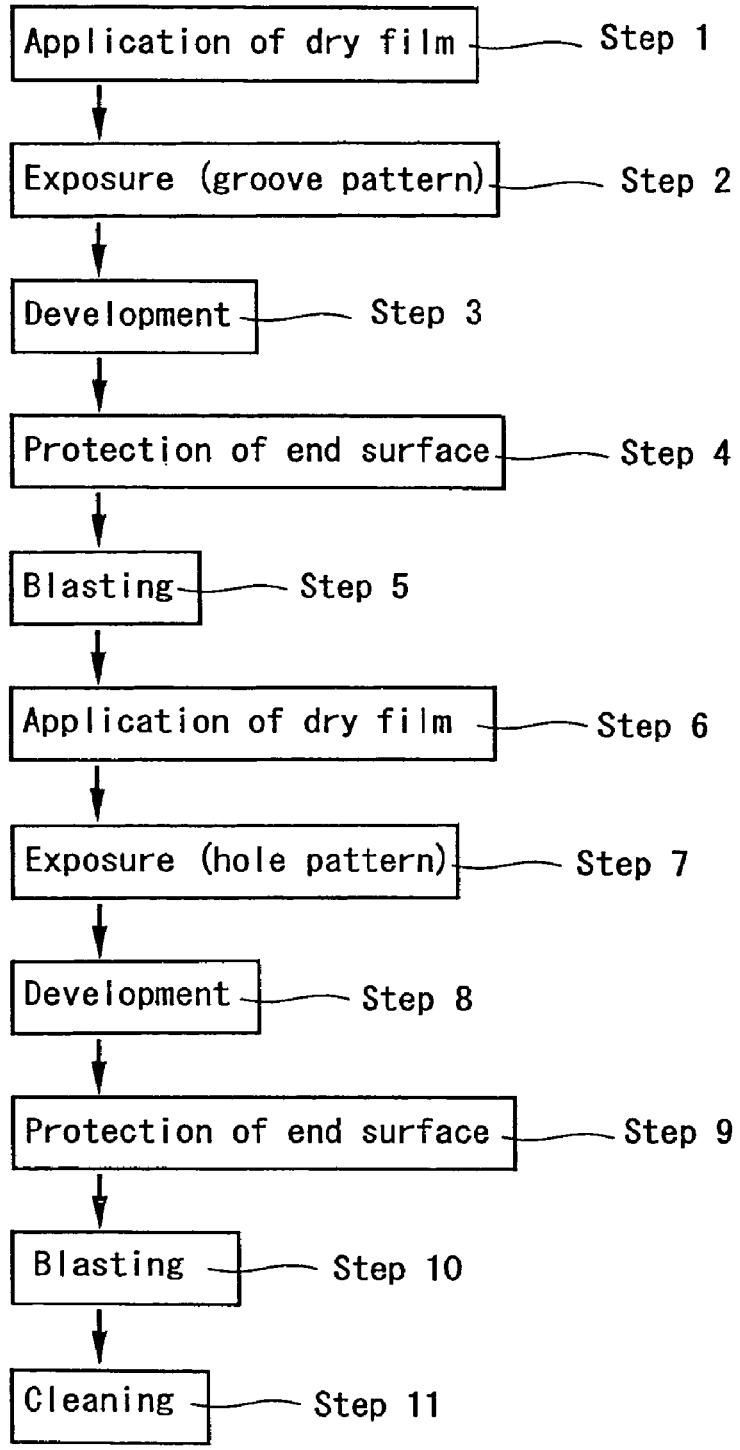
FIG. 2 shows the process for forming a supporting plate.

Embodiments of the present invention will be described below with reference to the attached drawings. FIG. 1 is a schematic view showing an embodiment of a supporting plate according to the present invention, and FIG. 2 shows the process for forming a supporting plate.

A supporting plate 1 according to the present invention shown in FIG. 1 is made of a glass plate, a ceramic plate or a metal plate.

A circuit-formed surface of a semiconductor wafer W is bonded to one of the surfaces of the supporting plate 1 by using an adhesive, which is not shown in the drawing.

According to the present invention, the supporting plate 1 has a unique structure as described below.

A first penetrating hole 2 is formed in a substantially central portion (center) of the supporting plate 1 so as to penetrate in the thickness direction. A plurality of first penetrating holes 2 may be formed, and for example, four penetrating holes 2 are formed in FIG. 1. However, the number of the penetrating holes 2 is not limited to this.

Also, grooves 3 connecting with the first penetrating hole 2 are formed on the surface of the supporting plate to which a semiconductor wafer W is bonded. The grooves 3 are formed so as to cover almost all the surface up to the outer periphery. As an example, the grooves 3 have a depth of 0.3 mm in a case where the supporting plate 1 has a thickness of 0.7 mm. The depth of the grooves 3 needs to be sufficient so as not to be filled with an adhesive layer interposed between the supporting plate 1 and the semiconductor wafer W for bonding. With this, a small gap is defined between the adhesive layer and the grooves 3, so that a solvent can quickly flow along the gap when the solvent is supplied as described below.

A second penetrating hole 4 is formed in a peripheral portion of the supporting plate 1. The second penetrating hole 4 penetrates in the thickness direction and connects with the grooves 3 so as to drain a solvent to the outside (for withdrawal). It is possible to provide a plurality of penetrating holes 4 in a peripheral portion of the supporting plate 1, for example, spaced completely around the peripheral portion as shown.

With the above-mentioned structure, the first penetrating hole 2 to supply a solvent from the outside and the second penetrating hole 4 to discharge a solvent to the outside are connected to each other via the grooves 3.

The grooves 3 are formed in a grid pattern, part of which is shown in the enlarged view of FIG. 1. The grooves 3 serve to connect the first penetrating hole 2 and the second penetrating hole 4 as mentioned above. Therefore, if a solvent is supplied from outside to the first penetrating hole 2, the solvent flows from the central portion to the peripheral (outer periphery) portion along the grooves 3, and reaches the second penetrating hole 4.

The process for forming the supporting plate 1 provided with the grooves 3 will be described below with reference to FIG. 2.

First, a glass plate is prepared, and a dry film resist is applied to a surface of the plate where the grooves 3 are to be formed (Step 1).

An exposure step and a development step are performed to the dry film resist by using a grid-patterned photo mask (See Steps 2 and 3).

With these steps, the grid-patterned dry film resist (a resist mask for forming the grooves 3) is formed on the surface of the glass plate.

Next, a protection step is performed to the periphery, and thereafter, cutting of the glass plate is performed by a sandblasting method with the grid-patterned dry film resist as a mask (See Steps 4 and 5).

With these steps, the grid-patterned grooves 3 are formed on the surface of the glass plate, which have a predetermined depth from the surface.

Next, a dry film resist is applied to the other surface of the glass plate (See Step 6).

An exposure step and a development step are performed to the dry film resist by using a photo mask for forming the first penetrating hole 2 and the second penetrating hole 4 (See Steps 7 and 8).

With these steps, the dry film resist corresponding to the first penetrating hole 2 and the second penetrating hole 4 (a resist mask for forming the first penetrating hole 2 and the second penetrating hole 4) is formed on the other surface of the glass plate.

Next, a protection step is performed to the periphery (Step 9), and thereafter, cutting of the glass plate is performed by a sandblasting method with the resist mask for forming the first penetrating hole 2 and the second penetrating hole 4 (Step 10).

Next, cleaning is performed to the glass plate (Step 11). With these steps, the first penetrating hole 2 is formed in the central portion of the glass plate, which penetrates in the thickness direction. The second penetrating hole 4 is formed in the periphery portion, which penetrates in the thickness direction.

In the process shown in FIG. 2, the grooves 3 are formed first, and the first penetrating hole 2 and the second penetrating hole 4 are formed next. However, this order may be reversed.

A dry etching method or a wet etching method may be used to form grid-patterned grooves instead of a sandblasting method. However, when these etching methods are used, it is difficult to form uniform grooves compared to a sandblasting method although it depends on the width or the depth of the grooves. A sandblasting method is preferred to form the grooves 3.

In the supporting plate 1 of the present embodiment, the penetrating hole 2 for supplying a solvent from outside is formed in the central portion of the supporting plate 1 in the thickness direction, the grid-patterned grooves connecting with the first penetrating hole 2 are formed on a surface of the supporting plate to be contacted with an adhesive, and the second penetrating hole 4 for draining a solvent to outside connecting with the grooves 3 is formed in the peripheral portion of the supporting plate 1 in the thickness direction. Therefore, when the supporting plate 1 is stripped from the semiconductor wafer W by using the stripping apparatus and a stripping method described below, it is possible to supply a solvent quickly to the whole surface of the adhesive which bonds the wafer W and the supporting plate 1 so as to strip the supporting plate 1 in a short period of time compared to the case of using a conventional supporting plate.

More specifically, since a conventional supporting plate has a structure in which a number of penetrating holes are formed in the thickness direction, dissolution of the adhesive starts in the area where the adhesive contacts with the penetrating holes. Therefore, it takes time to distribute the solvent over the adhesive uniformly.

In contrast, the supporting plate 1 according to the present embodiment has a structure in which the grid-patterned grooves 3 are formed on almost all the surface to be contacted with the adhesive. Therefore, the solvent supplied from the first penetrating hole 2 flows toward the periphery portion via the grid-patterned grooves 3 connecting with the first penetrating hole 2, so that the solvent can be distributed quickly over the adhesive.

Consequently, it is possible to strip the supporting plate 1 in a short period of time compared to a conventional supporting plate.

Further, since a number of penetrating holes are not formed over substantially the entire surface of the supporting plate 1 according to the present invention, unlike a conventional supporting plate, when the supporting plate 1 is stripped from the semiconductor wafer W 1 by using the stripping apparatus and method described below, it is possible to retain the area where no hole is formed by vacuum attraction. With this, it is possible to simplify the process for stripping the supporting plate 1 from the semiconductor wafer W.

Furthermore, since a number of penetrating holes are not formed over substantially the entire surface of the supporting plate 1 according to the present invention, unlike a conventional supporting plate, it is possible to improve the strength of the supporting plate 1, and increase the reuse rate.

Also, according to the present invention, since an excessive amount of force is not exerted on the semiconductor wafer W when the supporting plate 1 is stripped from the wafer W, there is little likelihood that cracking or chipping will occur in the wafer W.

Consequently, in the semiconductor wafer W to which the supporting plate 1 is attached, it is possible to utilize the surface ground by a grinder after thinning the wafer W as a second circuit-formed surface, for example.

Next, another embodiment of the supporting plate 1 will be described below.

Figure 3A:
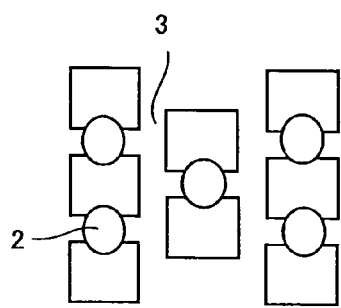
FIGS. 3(a), 3(b) are an enlarged views explaining staggered grooves.
Figure 3B:
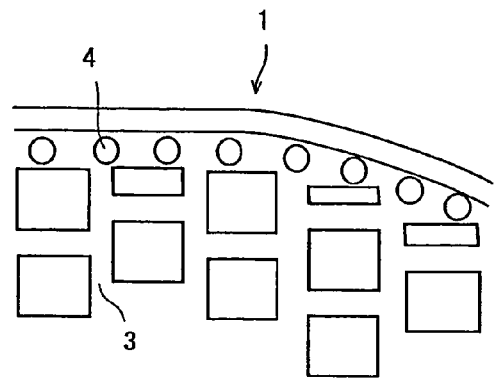

The shape of the grooves 3 is a grid in the above-mentioned embodiment of the supporting plate 1. However, the shape of the grooves 3 may be staggered (see the enlarged view of the grooves shown in FIG. 3(*a*) and the enlarged view of the periphery shown in FIG. 3(*b*)).

More specifically, the shape of the grooves 3 according to this embodiment is formed by staggering grid-patterned grooves 3 as shown in FIG. 1 in columns at a predetermined interval.

The staggered grooves 3 make it possible to supply the solvent quickly to the whole surface of the adhesive which bonds the wafer W and the supporting plate 1 in the same manner as the case of the grid-patterned grooves 3. Consequently, it is possible to strip the supporting plate 1 from the substrate in a short period of time compared to the case of using a conventional supporting plate.

Incidentally, the staggered grooves 3 can be formed in the same process shown in FIG. 2.

Next, another embodiment of the supporting plate will be described below.

The shape of the grooves 3 is honeycombed according to this embodiment. More specifically, the shape of the grooves 3 is hexagonal (see the enlarged view of the grooves shown in FIG. 4(*a*) and the enlarged view of the periphery shown in FIG. 4(*b*)).

In the case where the shape of the grooves 3 is hexagonal, it is possible to supply the solvent more quickly to the whole surface of the adhesive which bonds the wafer W and the supporting plate 1 compared to the cases of the grid-patterned grooves 3 and the staggered grooves 3. Consequently, it is possible to strip the supporting plate 1 from the substrate in a shorter period of time compared to the case of using a conventional supporting plate.

One of the reasons is that the solvent supplied from the central portion can more easily reach the peripheral portion compared to the cases of the grid-patterned grooves 3 and the staggered grooves 3, by arranging each of the adjacent hexagonal grooves 3 to be directed from the central portion to the peripheral portion.

The hexagonal grooves 3 can be formed in the same processes shown in FIG. 2.

As for the shape of the grooves 3, it is also possible to employ a coil shape in which the grooves are directed from the hole for supplying a solvent in the center toward the hole for draining the solvent in the periphery.

Also, the supporting plate may be comprised of frosted glass as follows:

Specifically, the surface of the glass substrate to which the semiconductor wafer W is attached is roughened by 0.05 mm-0.1 mm, although this is not shown in the drawings. Since the other features are the same as described above, they are not explained again.

In this supporting plate, a solvent supplied from the first penetrating hole 2 can permeate the whole surface by capillary action. With this, it is possible to achieve the same function as the case of the supporting plate provided with the grooves 3 described above.

Next, an embodiment of the apparatus and the method of stripping the supporting plate having the above-mentioned structure from the semiconductor wafer W will be described with reference to FIGS. 5 and 6.

Figure 4A:
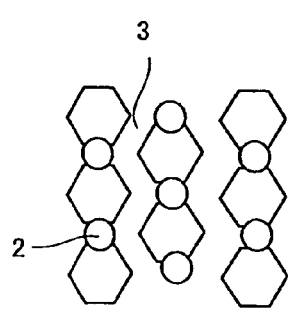
FIG. 4 is an enlarged view explaining honeycomb-shaped grooves.
Figure 4B:
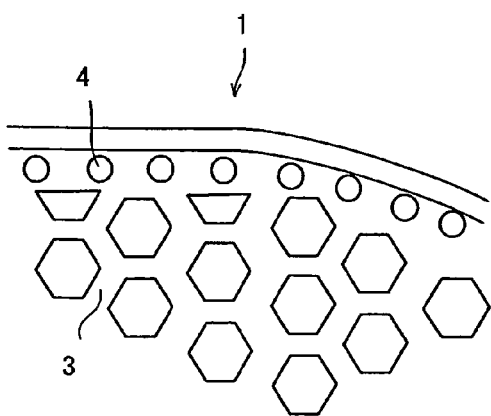

In this embodiment, the supporting plate 1 is provided with the hexagonal grooves 3 shown in FIG. 4, for example.

The stripping apparatus 20 according to the present embodiment comprises a plate 10. The plate 10 is supported by an elevator mechanism so as to be elevated or lowered in the vertical direction by a predetermined stroke.

A first penetrating hole 12 (for supplying a solvent from outside) is formed in the central portion of the plate 10, and a second penetrating hole 14 (for draining a solvent to outside) is formed in the periphery portion of the plate 10. Also, a hole 13 is formed between the first penetrating hole 12 and the second penetrating hole 14 in the radial direction. The hole 13 is used for vacuuming, and a recessed portion 15 is formed at the end of the hole 13 which is in contact with the supporting plate 1. The first penetrating hole 12 is connected to a solvent supplying means, for example, by a tube which is not shown in the drawings.

When the supporting plate 1 and the semiconductor wafer W bonded to the supporting plate 1 are attracted to the plate 10 having the above-mentioned structure by vacuum attraction using the hole 13, the hole for supplying a solvent 12 is coupled to the first penetrating hole 2 of the supporting plate 1 and the hole for draining a solvent 14 is coupled to the second penetrating hole 4 of the supporting plate 1. Also, the hole 13 is positioned in an area of the supporting plate 1 where the first penetrating hole 2 and the second penetrating hole 4 are not formed.

Next, stripping the supporting plate 1 from the semiconductor wafer W by using the stripping apparatus 20 will be described.

Figure 5:
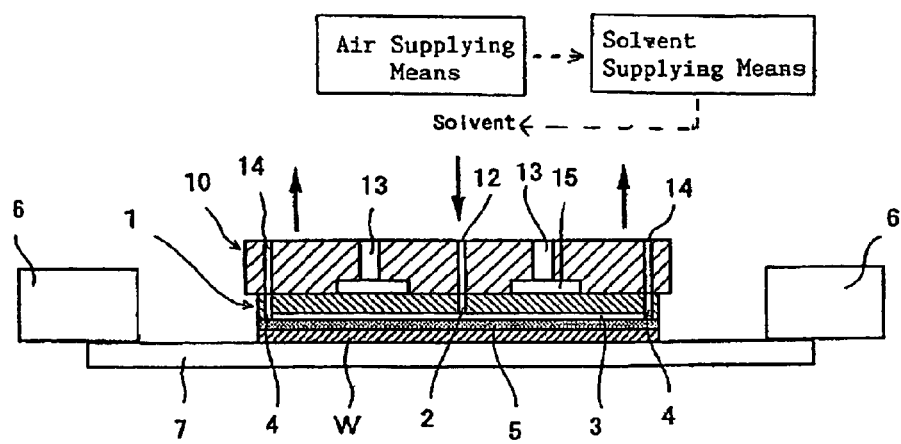
FIG. 5 is a schematic view showing an embodiment of an apparatus for stripping a supporting plate.
Figure 6:
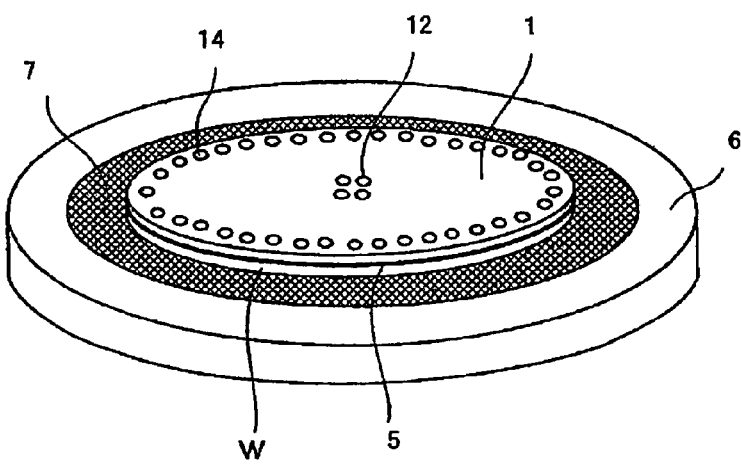
FIG. 6 is a perspective view of FIG. 5.

The plate 10 is pushed onto the upper surface of the supporting plate 1, so that the hole for supplying a solvent 12 of the plate 10 is aligned (coupled) to the first penetrating hole 2 of the supporting plate 1, and the hole for draining a solvent 14 is aligned (coupled) to the second penetrating hole 4 of the supporting plate 1 (see FIG. 5).

A solvent is supplied to the hole for supplying a solvent 12 of the plate 10 by a solvent supplying means (see FIG. 5) in this state.

The solvent flows toward the first penetrating hole 2 of the supporting plate 1, and reaches the hexagonal grooves 3 which connect with the penetrating hole 2.

In this instance, as described above, since the grooves 3 are formed so as to cover almost all surface of the supporting plate 1 up to the outer periphery, the solvent can be distributed quickly over an adhesive layer 5 so as to dissolve the adhesive layer 5.

The solvent used for dissolving the adhesive layer 5 flows to the second penetrating hole 4 formed in the periphery of the supporting plate 1 and connecting with the grooves 3, reaches the hole for draining a solvent 14 of the plate 10, and is drained to outside (and withdrawn).

Next (after a predetermined period of time passes), the supporting plate 1 is stripped from the semiconductor wafer W.

In this instance, the pressure inside the recessed portion 15 is reduced by the hole 13 for vacuuming, and the plate 10 is lifted up in the state where the supporting plate 1 is attracted to the plate 10 by vacuuming. In this way, the supporting plate 1 is stripped and the semiconductor wafer W is left fixed to a dicing tape 7. Incidentally, the dicing tape 7 has adhesiveness and is retained by a frame 6.

According to the present embodiment of the stripping apparatus and the stripping method, the solvent supplied to the hole for supplying a solvent 12 of the plate 10 flows toward the first penetrating hole 2 of the supporting plate 1, and reaches the periphery of the supporting plate 1 via the hexagonal grooves 3 which connect with the penetrating hole 2 of the supporting plate 1. The solvent flows to the hole for draining a solvent 14 of the plate 10 via the second penetrating hole 4 formed in the periphery of the supporting plate 1 to be drained to outside.

As described above, the grooves 3 make it possible to supply the solvent quickly to the whole surface of the adhesive layer 5. Consequently, it is possible to strip the supporting plate 1 in a shorter period of time compared to the case of using the conventional supporting plate.

Incidentally, when the supporting plate 1 is stripped from the semiconductor wafer W, there are cases where the supporting plate 1 is still attached to the semiconductor wafer W due to surface tension of the solvent used for dissolving the adhesive layer 5, which makes it difficult to strip the supporting plate 1.

In these cases, it is possible to make the supporting plate 1 easier to strip by cancelling (breaking) the surface tension with air supplied from the solvent supplying hole of the plate 10 to the first penetrating hole 2 of the supporting plate 1.

In order to achieve this method, an air supplying means may be provided in a stripping apparatus having the above-mentioned structure, and a tube of the air supplying means may be connected to a tube of the solvent supplying means which leads to the solvent supplying hole of the plate 10.

In the above-mentioned embodiments, a solvent is supplied to the central portion and drained from the peripheral portion of the supporting plate. However, it is also possible to supply a solvent to the peripheral portion and drain from the central portion.

In this instance, the second penetrating hole 4 formed in the peripheral portion of the supporting plate 1 is used for supplying a solvent from outside, and the first penetrating hole 2 formed in the central portion of the supporting plate 1 is used for draining the solvent to the outside.

Also, in the plate 10 of the stripping apparatus 20, the hole 14 formed in the peripheral portion is used for supplying a solvent from outside, and the hole 12 formed in the central portion is used for draining the solvent to the outside.

Since the other features are the same as mentioned above, they are not explained again.

It should be noted that the same function can be achieved in the above-mentioned case as in the case where a solvent is supplied to the central portion and drained from the peripheral portion.

Figure 7:
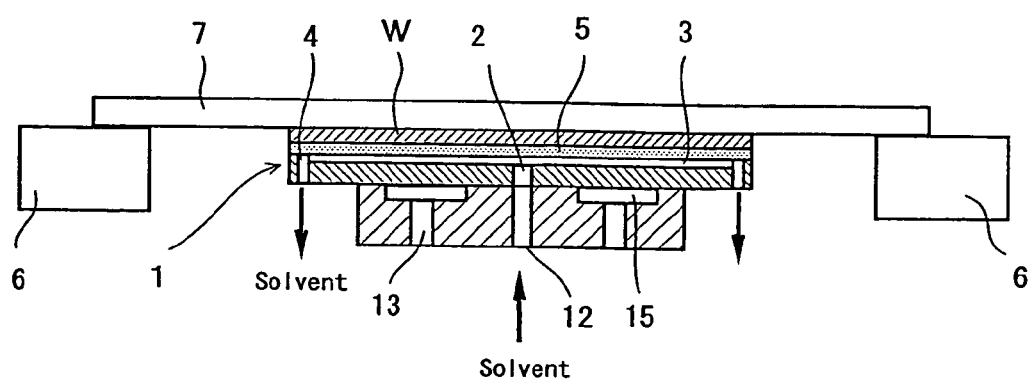
FIG. 7 is a view showing another embodiment of the apparatus for stripping a supporting plate.
Figure 8:
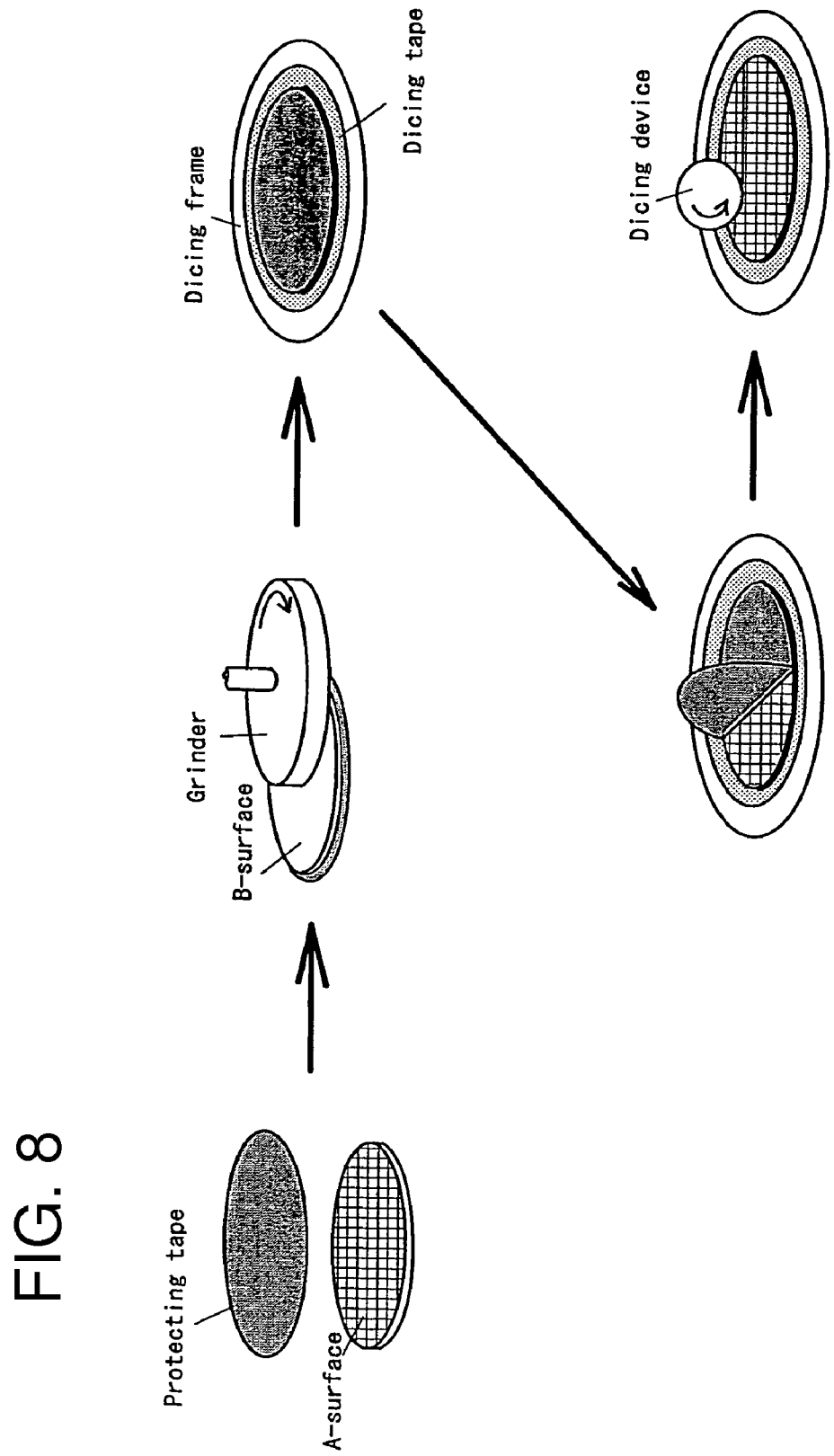
FIG. 8 is a view explaining a conventional method for stripping a supporting plate.
Figure 9:
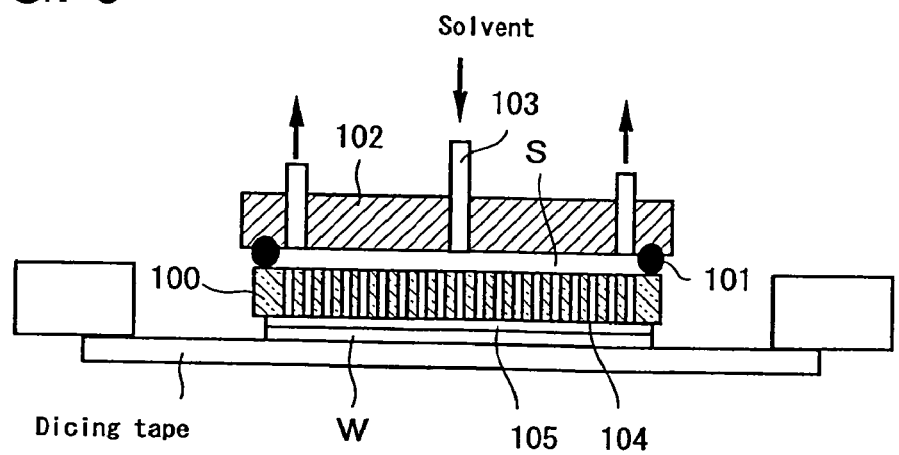
FIG. 9 is a view explaining the conventional method for stripping a supporting plate.
Figure 10:
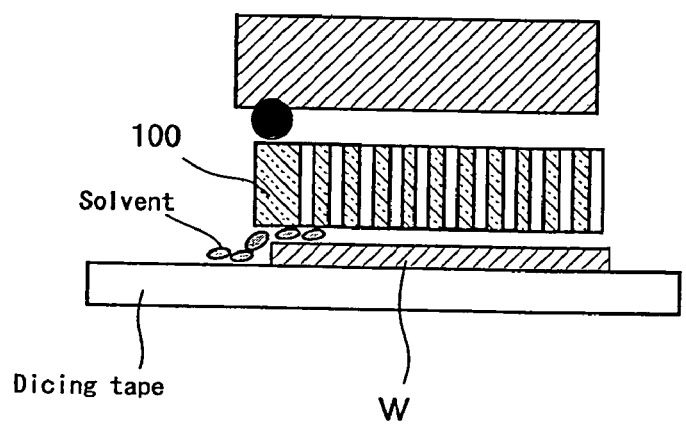
FIG. 10 is a view explaining a drawback of the conventional art for stripping a supporting plate.

In the stripping apparatus 20 according to the present embodiment, the plate 10 is provided on the upper surface of the supporting plate 1 as shown in FIG. 5. However, the plate 10 may be provided on the lower surface of the supporting plate 1 as shown in FIG. 7.

In this instance, it is not necessary to form the solvent draining hole 14 although the solvent supplying hole 12 is formed in the plate 10.

The present invention is not limited to the above-mentioned embodiments, and other various structures are possible within the scope of the present invention.

EFFECT OF THE INVENTION

According to the present invention, a solvent can be supplied to the whole surface of the adhesive which bonds the substrate and the supporting plate so as to strip the supporting plate in a short period of time and reduce the treatment time.

Accordingly, it is possible to achieve a supporting plate, an apparatus and a method for stripping a supporting plate suitable for reducing the treatment time with high reliability.

What is claimed is:

1. A method for stripping a supporting plate from a circuit-formed surface of a substrate to which the supporting plate is bonded with an adhesive, comprising the steps of:
   prior to the supporting plate being bonded to the substrate, forming a first penetrating hole in a substantially central portion of the supporting plate in the thickness direction, forming grooves connecting with the first penetrating hole on a surface of the supporting plate to be contacted with the adhesive, and forming a second penetrating hole connecting with the grooves in a peripheral portion of the supporting plate in the thickness direction;
   providing a second plate which has a first penetrating hole formed in a substantially central portion thereof in the thickness direction, a second penetrating hole formed in a peripheral portion thereof in the thickness direction, and a hole for attracting the supporting plate formed between the first penetrating hole and the second penetrating hole in the radial direction of the second plate;
   engaging the second plate to the supporting plate which is bonded to the substrate such that the first and second penetrating holes of the second plate are aligned with the first and second penetrating holes of the supporting plate;
   supplying a solvent from outside to the first penetrating hole of the second plate and to the aligned first penetrating hole formed of the supporting plate;
   distributing the solvent from the first penetrating hole of the supporting plate through the grooves formed on the surface of the supporting plate in contact with the adhesive so as to dissolve the adhesive on the surface contacted with the substrate by the solvent;
   draining the solvent used for dissolving the adhesive from the second penetrating holes of the supporting plate the second plate; and
   supplying air from outside to the first penetrating hole of the second plate so as to distribute the air from the first penetrating hole of the supporting plate to the grooves which connect with the first penetrating hole of the supporting plate after the step of dissolving the adhesive.

2. The method according to claim 1, comprising the further step of attracting the supporting plate to the second plate by applying vacuum to the hole for attracting the supporting plate formed between the first penetrating hole and the second penetrating hole in the radial direction of the second plate.

3. The method according to claim 1, wherein the grooves formed on the surface of the supporting plate are in a grid, are staggered, or form a honeycomb pattern.

4. The method according to claim 1, wherein a plurality of the second penetrating holes are formed in each of the supporting plate and the second plate, the second penetrating holes of the supporting plate are formed in spaced relation to each other around the peripheral portion of the supporting plate and the second penetrating holes of the second plate are formed in spaced relation to each other around the peripheral portion of the second plate.

5. The method according to claim 1, wherein the grooves are formed in a pattern covering substantially the entire area of the surface of the supporting plate.

6. A method for stripping a supporting plate from a circuit-formed surface of a substrate to which the supporting plate is bonded with an adhesive, comprising the steps of:

prior to the supporting plate being bonded to the substrate, forming a first penetrating hole in one of a substantially central portion and a peripheral portion of the supporting plate in the thickness direction, forming grooves connecting with the first penetrating hole on a surface of the supporting plate to be contacted with the adhesive, and forming a second penetrating hole connecting with the grooves in the other of the substantially central portion and the peripheral portion of the supporting plate in the thickness direction;

providing a second plate which has a first penetrating hole formed in one of a substantially central portion and a peripheral thereof in the thickness direction, a second penetrating hole formed in the other of the substantially central portion and the peripheral portion thereof in the thickness direction, and a hole for attracting the supporting plate formed between the first penetrating hole and the second penetrating hole in the radial direction of the second plate;

engaging the second plate to the supporting plate which is bonded to the substrate such that the first and second penetrating holes of the second plate are aligned with the first and second penetrating holes of the supporting plate;

supplying a solvent from outside to the first penetrating hole of the second plate and to the aligned first penetrating hole formed of the supporting plate;

distributing the solvent from the first penetrating hole of the supporting plate through the grooves formed on the surface of the supporting plate in contact with the adhesive so as to dissolve the adhesive on the surface contacted with the substrate by the solvent;

draining the solvent used for dissolving the adhesive from the second penetrating holes of the supporting plate the second plate; and supplying air from outside to the first penetrating hole of the second plate so as to distribute the air from the first penetrating hole of the supporting plate to the grooves which connect with the first penetrating hole of the supporting plate after the step of dissolving the adhesive.

7. The method according to claim 6, comprising the further step of attracting the supporting plate to the second plate by applying vacuum to the hole for attracting the supporting plate formed between the first penetrating hole and the second penetrating hole in the radial direction of the second plate.

8. The method according to claim 6, wherein the grooves formed on the surface of the supporting plate are in a grid, are staggered, or form a honeycomb pattern.

9. The method according to claim 6, wherein the grooves are formed in a pattern covering substantially the entire area of the surface of the supporting plate.

10. The method according to claim 6, wherein the first penetrating hole of the supporting plate is formed in the peripheral portion of the supporting plate, and the first penetrating hole of the second plate is formed in the peripheral portion of the second plate.

11. The method according to claim 10, wherein a plurality of the first penetrating holes are formed in each of the supporting plate and the second plate, the first penetrating holes of the supporting plate are formed in spaced relation to each other around the peripheral portion of the supporting plate and the first penetrating holes of the second plate are formed in spaced relation to each other around the peripheral portion of the second plate.

\* \* \* \* \*